United States Patent
Burch et al.

(10) Patent No.: US 10,910,901 B2
(45) Date of Patent: Feb. 2, 2021

(54) WOUND STATOR WITH INSULATION SYSTEM FORMING A WIRE GUIDE FOR A WINDING OPERATION

(71) Applicant: Globe Motors, Inc., Dayton, OH (US)

(72) Inventors: Jerry C. Burch, Waynesville, OH (US); James W. Moran, Dayton, OH (US); Allen Abel, Vandalia, OH (US)

(73) Assignee: Globe Motors, Inc., Dayton, OH (US)

( * ) Notice: Subject to any disclaimer, the term of this patent is extended or adjusted under 35 U.S.C. 154(b) by 865 days.

(21) Appl. No.: 15/139,393

(22) Filed: Apr. 27, 2016

(65) Prior Publication Data

US 2017/0133901 A1    May 11, 2017

Related U.S. Application Data

(60) Provisional application No. 62/251,432, filed on Nov. 5, 2015.

(51) Int. Cl.
*H02K 3/34* (2006.01)
*H02K 1/16* (2006.01)
(Continued)

(52) U.S. Cl.
CPC .............. *H02K 3/34* (2013.01); *H02K 1/04* (2013.01); *H02K 1/16* (2013.01); *H02K 3/325* (2013.01);
(Continued)

(58) Field of Classification Search
CPC H02K 3/34; H02K 3/345; H02K 1/04; H02K 1/16
(Continued)

(56) References Cited

U.S. PATENT DOCUMENTS 4,340,829 A    7/1982 McCoy
4,562,164 A * 12/1985 Miyazaki ................ H02K 3/30
310/215
(Continued)

FOREIGN PATENT DOCUMENTS

DE     102011081030 A1   2/2013
EP         1883145 A2   1/2008
(Continued)

OTHER PUBLICATIONS

Marianne Von Rauch; International Search Report and Written Opinion; International Application No. PCT/US2016/057874; dated Jul. 5, 2017; European Patent Office; Rijswijk, Netherlands.
(Continued)

*Primary Examiner* — Michael Andrews
(74) *Attorney, Agent, or Firm* — Stevens & Showalter LLP

(57) ABSTRACT

A wound stator for a dynamo-electric machine comprising a stator stack having a unitary cylindrical yoke and a plurality of circumferentially spaced, radially inward extending stator teeth defining stator slots therebetween. A winding is formed by a strand of wire forming turns around each stator tooth, each winding including a first lead end extending from a stator slot on a first side of a respective stator tooth and a second lead end extending from a stator slot on a second side of the respective stator tooth. An insulation system is provided including an insulating structure septum extending through each stator slot between windings located on two adjacent stator teeth, the turns of each winding located between a respective stator tooth and a first surface of the insulating structure septum engaged with the winding.

27 Claims, 11 Drawing Sheets

(51) Int. Cl.
*H02K 3/38* (2006.01)
*H02K 3/32* (2006.01)
*H02K 1/04* (2006.01)
*H02K 3/28* (2006.01)

(52) U.S. Cl.
CPC .............. *H02K 3/345* (2013.01); *H02K 3/38* (2013.01); *H02K 3/28* (2013.01); *H02K 2203/12* (2013.01)

(58) Field of Classification Search
USPC .................................. 310/215, 214, 216.04
See application file for complete search history.

(56) References Cited

U.S. PATENT DOCUMENTS

| | | | |
|---|---|---|---|
| 4,852,245 | A | 8/1989 | Denk |
| 4,893,041 | A | 1/1990 | Snider et al. |
| 5,013,953 | A | 5/1991 | Odell |
| 6,633,102 | B2 | 10/2003 | Nagai et al. |
| 6,674,195 | B2 | 1/2004 | Yagyu et al. |
| 6,930,427 | B2 | 8/2005 | Grant et al. |
| 7,191,974 | B2 | 3/2007 | Burch et al. |
| 7,200,917 | B2 | 4/2007 | Takano et al. |
| 7,595,572 | B2 | 9/2009 | Haga et al. |
| 8,546,992 | B2 | 10/2013 | Hsu et al. |
| 8,638,019 | B2 | 1/2014 | Stark et al. |
| 8,653,711 | B2 | 2/2014 | Burch et al. |
| 2009/0096313 | A1* | 4/2009 | Harada ............... H02K 3/522 310/201 |
| 2010/0141079 | A1 | 6/2010 | Chu et al. |
| 2011/0095641 | A1* | 4/2011 | Rhoads ............... H02K 3/345 310/215 |
| 2011/0115317 | A1* | 5/2011 | Stark .................... H02K 1/148 310/71 |
| 2014/0292119 | A1* | 10/2014 | Takahashi ............ H02K 3/12 310/54 |

FOREIGN PATENT DOCUMENTS

| | | |
|---|---|---|
| EP | 2677633 A1 | 12/2013 |
| FR | 2905534 A1 | 10/2009 |
| JP | 2006115563 A | 4/2006 |
| JP | 2008253014 A | 10/2008 |

OTHER PUBLICATIONS

Marianne Von Rauch; Notification of Decision on Protest; International Application No. PCT/US2016/057874; dated Jul. 5, 2017; European Patent Office; Munich, Germany.

* cited by examiner

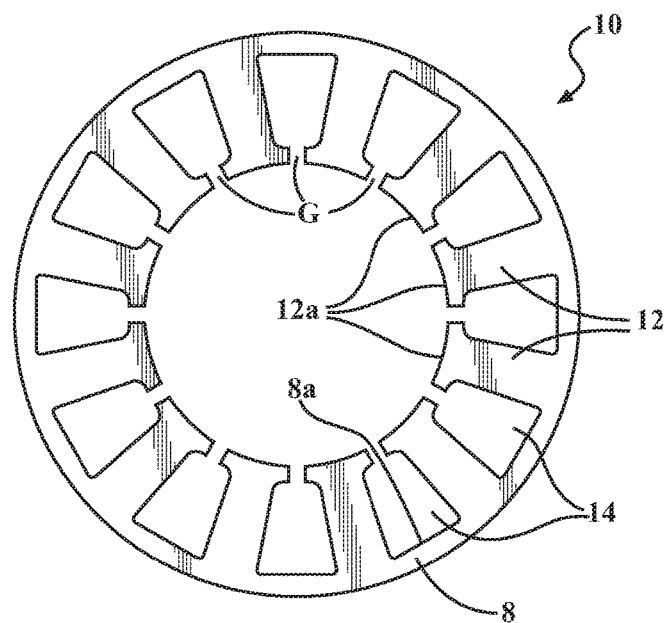
FIG. 2
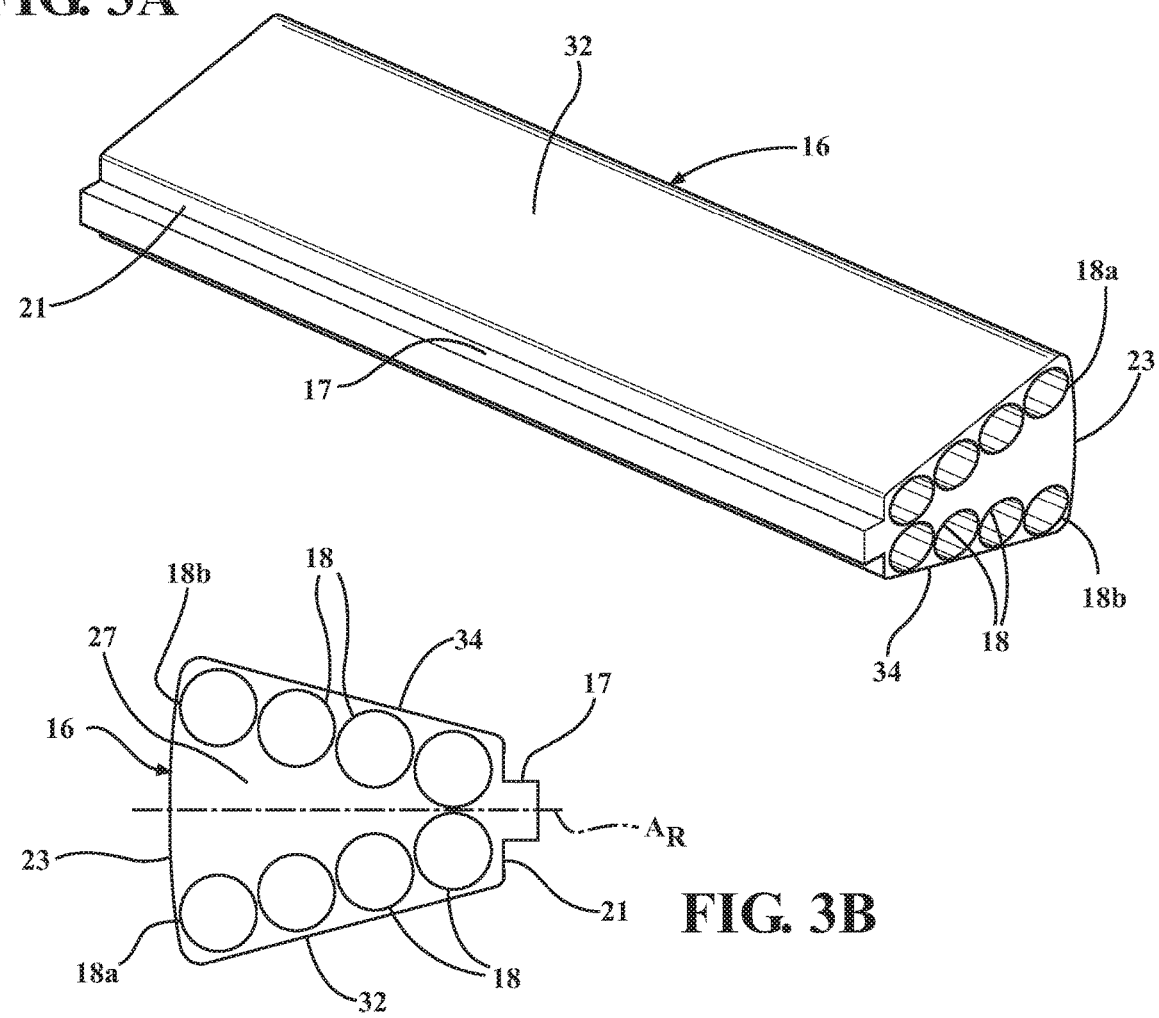
FIG. 3A
FIG. 3B

WOUND STATOR WITH INSULATION SYSTEM FORMING A WIRE GUIDE FOR A WINDING OPERATION

CROSS REFERENCE TO RELATED APPLICATION

This application claims the benefit of U.S. Provisional Patent Application Ser. No. 62/251,432, filed Nov. 5, 2015, entitled "WOUND STATOR WITH WIRE GUIDES AND METHOD OF FORMING", the entire disclosure of which is incorporated by reference herein.

BACKGROUND OF THE INVENTION

In power steering motors, a short between phases can create a force that operates to resist turning of the motor. In the event that a short occurs in a power assist motor for a power steering system, application of a force to turn the steering wheel can result in an opposite dynamic braking force applied through the motor that can prevent movement of the steering wheel. As a safety measure, the power assist motor may include a relay, such as a relay mounted to the lead frame of the motor, wherein the relay is configured to open a short in the windings in order to prevent the short from affecting movement of the steering wheel.

Also, known motor winding techniques may produce stator windings that can include current leakage between adjacent windings that diminish the performance of the motor. For example, the insulating coating on the wire forming the windings may be compromised during winding of the stator, which could allow a limited leakage of current between windings due to the close proximity of the windings to each other, i.e., due to contact between windings.

SUMMARY OF THE INVENTION

In accordance with an aspect of the invention, a wound stator for a dynamo-electric machine is provided comprising a stator stack. The stator stack comprising a unitary cylindrical yoke and a plurality of circumferentially spaced, radially inward extending stator teeth defining stator slots therebetween. A winding is formed by a strand of wire forming turns around each stator tooth, each winding including a first lead end extending from a stator slot on a first side of a respective stator tooth and a second lead end extending from a stator slot on a second side of the respective stator tooth. An insulation system is provided including an insulating structure extending through each stator slot between windings located on two adjacent stator teeth, the turns of each winding located between a respective stator tooth and a first surface of the insulating structure engaged with the winding.

The insulating structure may further include a second surface connected to the first surface of the insulating structure, each second surface being located between the turns of a winding and a respective stator tooth.

The first and second surfaces of the insulating structure may each have radius portions, each radius portion having a radius that intersects a central axis of a wire turn engaged on a respective surface of the insulating structure.

The insulating structure may comprise an insert member located in each stator slot, each insert member may have axially extending holes for receiving respective turns of a winding, and each hole defining respective first and second surfaces of the insulating structure.

The holes may be located in a row extending in a radial direction.

One or more additional holes may be provided located adjacent to and circumferentially displaced from each row of holes.

The insulating structure may comprise an insert member located in each stator slot, each insert member having a pair of insert slots and each insert slot defined by circumferentially spaced, radially elongated walls defining the first and second surfaces of the insulating structure.

A radially inner end of the insert slots may include walls circumferentially spaced about equal to a diameter of the strand of wire.

A radially outer end of the insert slots may be circumferentially spaced about equal to twice the diameter of the strand of wire.

Axially extending rib structures may be provided on the first and second surfaces, the rib structures extending between adjacent turns of a winding.

The rib structures may extend between adjacent turns of the winding and define discrete curved surfaces for engaging the turns of the winding.

The insulating structure may include a radially inner wall extending in a gap between inner ends of the adjacent stator teeth and a radially outer wall extending along an inner surface of the yoke, and the first and second surfaces of the insulating structure may be connected to the radially inner and outer walls.

The insulation system may include an end lamina defining an axially outer side of the stator teeth having circumferential grooves defining radially spaced positions between adjacent end turns of a respective winding located in the grooves.

In accordance with another aspect of the invention, a wound stator for a dynamo-electric machine is provided comprising a stator stack. The stator stack comprising a unitary cylindrical yoke and a plurality of circumferentially spaced, radially inward extending stator teeth defining stator slots therebetween. A winding is formed by a strand of wire forming turns around each stator tooth, each winding including a first lead end extending from a stator slot on a first side of a respective stator tooth and a second lead end extending from a stator slot on a second side of the respective stator tooth. An insulation system is provided including an insulating septum wall extending through each stator slot between windings located on adjacent stator teeth and filling interstitial space defined between the windings on the adjacent stator teeth.

The insulation system may include a radially inner wall extending in a gap between inner ends of the adjacent stator teeth and a radially outer wall extending along an inner surface of the yoke, and the septum wall is connected to the radially inner and outer walls.

The insulation system may include stator slot lining walls connected to the radially inner and outer walls and extending radially along surfaces of the adjacent stator teeth between respective windings and stator teeth.

A row of axially extending holes may be provided located between the septum wall and each stator slot lining wall, and a turn of the wire strand for one winding extending through each hole in a respective row.

One or more additional holes may be provided located between each row of holes and a respective septum wall.

The insulation system may include end lamina defining an axially outer side of the stator teeth having circumferential grooves defining radially spaced positions between adjacent end turns of a respective winding located in the grooves.

The insulation system may isolate adjacent turns in each winding from contact with each other within the slots and at the end turns.

The insulation system may comprise an insert member located in each stator slot, each insert member having a pair of insert slots located on either side of the septum wall, and each insert slot comprising a radially elongated and axially extending opening between the septum wall and a stator slot lining wall.

Each insert slot may be dimensioned in the circumferential direction to define a space about equal to a diameter of the strand of wire.

The walls defining the radially elongated openings may define discrete rib structures extending between adjacent turns of a winding.

In accordance with a further aspect of the invention, a wound stator for a dynamo-electric machine is provided comprising a stator stack. The stator stack comprises a cylindrical yoke and a plurality of circumferentially spaced, radially inward extending stator teeth defining stator slots therebetween. A non-conductive insert member is located within each slot. Each insert member includes a plurality of axially extending holes, each hole defining a guide passage that is electrically isolated from the stator teeth. At least one strand of wire forming a winding spans circumferentially across a stator tooth between first and second insert members located on either side of the stator tooth.

The holes in the insert members may be arranged in rows, each row being oriented in a generally radial direction of a respective slot.

Each insert member may include two rows of holes located on circumferentially spaced sides of each slot adjacent to a tooth.

Additional axially extending holes may be provided located between the two rows of holes.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 2 is an end view of the stator of FIG. 1;

FIGS. 3A and 3B are perspective and end views, respectively, of an insert member of FIG. 1;

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

The present invention provides a method of winding a stator and a wound stator construction that, in one embodiment, provides complete phase-to-phase isolation between windings and in an alternative embodiment provides both isolation between windings and turn-to-turn isolation between adjacent turns forming the windings. In both cases, the present invention further electrically isolates the windings from the stator core. The stator core is an integral preformed structure comprising a unitary cylindrical yoke and having a plurality of radially inward extending stator teeth formed integrally with the yoke and that are spaced circumferentially and that define circumferentially distributed stator slots. The stator windings are formed around the stator teeth and into the slots. The isolation between windings is accomplished without adding insulation on the wire or otherwise altering the structure of the wire to increase insulating properties of the wire.

The stator core used for the present wound stator construction can include a gap between radially inner ends of the stator teeth at an inner diameter (ID) of the stator. However, as noted further below, the gap between stator teeth at the ID of the stator can be decreased as compared to prior stator cores. Also, in the present wound stator construction, the stator core used in the present wound stator construction can be provided without an insulating coating, whereas stator cores provided in prior winding operations may require an insulating coating, such as a resin insulating coating, to form an electrically insulating barrier between the stator core and the windings.

Figure 1:
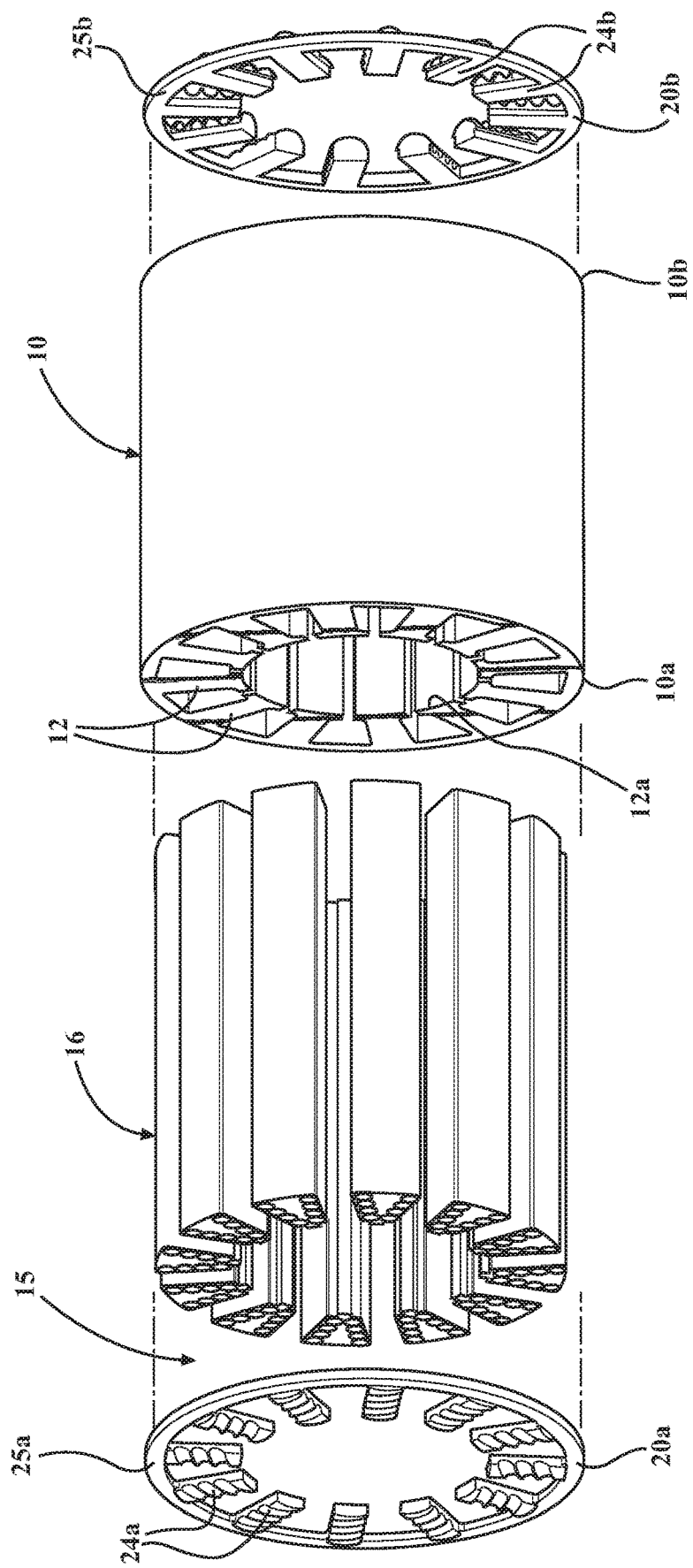
FIG. 1 is an exploded perspective view of a stator core, insert members, and top and bottom end laminae in accordance with an aspect of the present invention.

Referring to FIGS. 1 and 2, the present invention provides a stator core 10 formed as a stator stack comprising a plurality of stacked laminae. The stator core 10 comprises a unitary cylindrical yoke 8 forming an outer peripheral wall structure of the stator core 10, and a plurality of radially inward extending stator teeth 12 defining axially extending stator slots 14 therebetween. Each tooth 12 includes a circumferentially extending inner wall portion 12a defined at a radially inner end thereof, and a gap G is defined between inner wall portions 12a of adjacent teeth 12.

In accordance with an aspect of the invention, an insulation system is mounted to the stator core 10. The insulation system includes an insulating structure 15 that is adapted to extend into the stator slots 14, and respective top and bottom end laminae 20a, 20b that form end laminae of the stator core 10 which are formed of a non-conductive material. In the embodiment illustrated in FIG. 1, the insulating structure 15 is formed by insert members 16 that further function as wire guides to facilitate placement of wire in the stator slots 14. The insert members 16 are provided to the stator slots 14 prior to the winding operation and may comprise a generally rigid filler element that is configured as a preformed insert member 16 inserted into the slot 14 in the axial direction of the stator core 10 to define a stator core assembly 11 (FIGS. 4A, 4B and 7), or the insert member could be provided by any other means such as by forming of the insert member 16 in place within the slot 14 or forming the insert member 16 with build-up, i.e., lamination, of the laminae of the stator stack during construction of the stator core 10. The insert members 16 in the present embodiment completely fill the slot 14 and may form predefined axial paths through the stator core 10 for each of the wire passes through the slots 14 during formation of turns forming a wire winding on the stator core 10. In one embodiment, the insert members 16 can each be formed as a wedge shaped insert element (FIG. 3A) having a cross section matching that of the slots 14 and configured to be inserted into a respective slot 14, wherein each tooth 12 has a pair of insert members 16 located on either side thereof for guiding wire W forming a winding around the tooth 12. Further, a narrow radially inner edge or inner wall of the insert member 16 can be formed with an axially extending rib 17 dimensioned to extend into the gap G between stator teeth 12, such that a normally open recess formed at the gap G is filled by the rib 17, creating a continuous ID surface around the interior circumference of the stator assembly 11 prior to a winding operation.

Each insert member 16 is formed of an electrically insulating, i.e., non-conductive, material and defines a predetermined passage 18 for each pass of the wire turns forming the winding extending through the slot 14. That is, the wire passages 18 defined by the insert member 16 are formed by elongated holes through the insert members 16 and the material of the insert member 16 fully surrounds each pass of the winding wire W passing through the wire passage 18. Each insert member 16 includes two rows 18a, 18b of holes or passages 18 (see FIGS. 3B, 4 and 7), each row 18a, 18b extending radially between a radially inner wall 21 and a radially outer wall 23 of the insert member 16 located adjacent to the ID and OD, respectively, of the stator core 10. The ID of the stator core 10 is defined by circumferentially extending inner wall portions 12a (FIG. 2) of the teeth 12, and the OD of the stator 10 is defined by the yoke 8 having an inner surface 8a engaged by the outer wall 23 of the insert member 16, see FIG. 7.

The holes forming the passages 18 extend the axial length of the insert member 16 to define predetermined axial paths for guiding the wire W as it passes though the slot 14. To provide the required number of turns for the winding configuration illustrated herein, each of the rows 18a, 18b includes four holes, and each row of holes is arranged parallel to an adjacent stator tooth 12 when the insert member 16 is in position within the stator slot 14.

As noted above, the insert members 16 form an insulating structure 15. The material between rows 18a, 18b of holes in an insert member 16 defines an insulating septum wall 27 connected to the radially inner and outer walls 21, 23 and extending centrally along a radial axis $A_R$ (FIG. 3B) of the insert member 16 that fills the interstitial space between the windings on adjacent stator teeth 12. The septum wall 27 forms an insulating barrier between adjacent windings in a slot 14. Portions of the surfaces of the passages 18 adjacent to the septum wall 27 define a first surface 29 of the insulating structure 15 facing toward a respective stator tooth 12 and engaged with the winding W. That is, the portion of the insert member 16 defining the septum wall 27 between adjacent windings in a slot 14 provides a first or engagement surface 29, i.e., defined in the passages 18, that determines the spacing between the two windings in the slot 12.

The insulating structure 15 formed by the insert members 16 additionally defines stator slot lining walls 32, 34 connected to the radially inner and outer walls 21, 23 and extending radially along surfaces of adjacent stator teeth 12. The slot lining walls 32, 34 form an insulating structure between each row 18a, 18b of holes and a respective adjacent stator tooth 12. The surfaces of the passages 18 adjacent to the slot lining walls 32, 34 define a second surface 31 (FIG. 7) of the insulating structure 15 facing away from a respective adjacent stator tooth 12. That is, the portion of the insert member 16 defining the slot lining walls 32, 34 provides a second or engagement surface 31, i.e., defined in the passages 18, that defines the spacing between the winding wire W and a surface of the adjacent stator tooth 12.

In an exemplary embodiment of the insert member 16, the insert member 16 can be formed of Teflon and pushed into the slot 14, bending to conform to a skewed path of the slot 14 extending axially in a longitudinal direction through the stator core 10. Alternatively, the insert member 16 can be formed with a skewed configuration that facilitates insertion of the insert member 16 into the stator slot 14. It may be understood that the insert member 16 is not limited to any particular material and the material may be selected to optimize required dielectric properties and preferably has thermal conductivity properties that facilitates conductive heat transfer from the wire W of the windings to the exterior of the stator assembly 11.

Figure 4A:
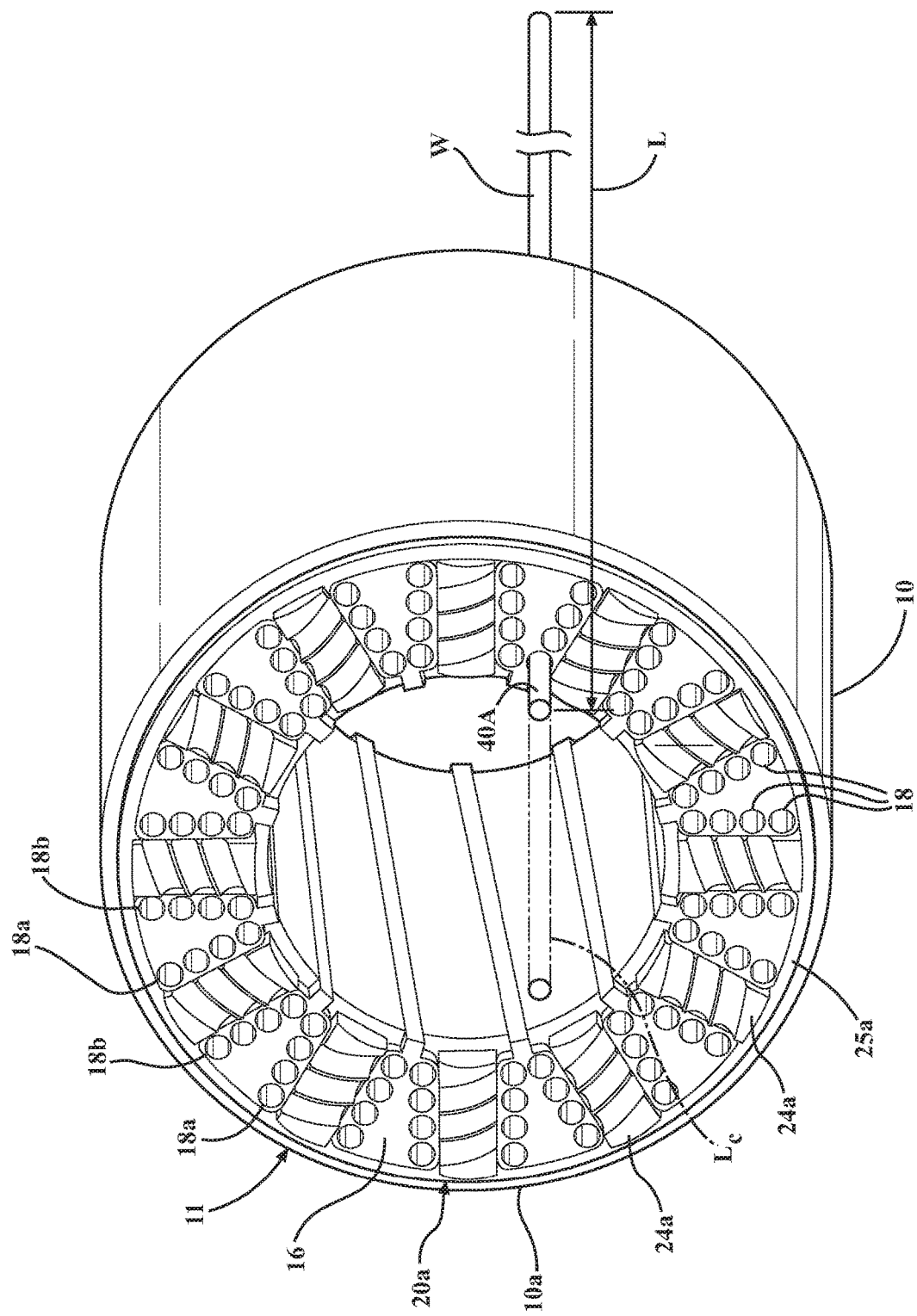
FIG. 4A is a perspective end view of a stator assembly comprising insert members inserted into stator slots and including a top end lamina positioned on the end of the stator.

In a winding operation, wire W can be inserted through a wire passage 18 in a first insert member 16 at a first or top end 10a of the stator assembly 11 and guided to the opposite second or bottom end 10b of the stator assembly 11. The wire W is bent to form an end turn across a tooth 12 of the stator assembly 11 to an adjacent slot 14 where it is passed through a wire passage 18 in a second insert member 16 in the adjacent slot 14 and guided back to the top end 10a of the stator 10. As illustrated in FIG. 4A, the winding operation is preferably performed using a predetermined length L of wire W inserted through the stator assembly 11, where the predetermined length L is at least equal to the wire quantity to form all of the turns of the winding, and wherein it may be understood that the predetermined length L of wire W may be provided from a continuous wire supply depicted by wire portion $L_C$.

More particularly, in an exemplary winding operation described with reference to FIG. 7, formation of a wire winding is described with reference to forming a completed winding having leads or terminal ends located at the top end 10a of the stator assembly 11. Wire W can be initially inserted through a first wire passage $18A_1$ of a first insert member 16a to a predetermined length L that is equal to the length of the wire W forming the winding and including a length of wire W forming a terminal end at the end of the winding operation. It may be understood that the length L additionally includes a length of the wire W extending above the stator assembly 11 that is not inserted through the wire passage 18A$_1$ and that forms a first terminal end 40a (FIG. 4A). The wire W is doubled back at the bottom end 10b of the stator assembly 11, forming a bottom end turn 22b (FIG. 6B), and inserted through a first wire passage 18B$_1$ of the second insert member 16b. The wire W is doubled back at the top end 10a of the stator assembly 11, forming a top end turn 22a (FIG. 6A), and the winding sequence is repeated, sequentially inserting the wire W into the wire passages 18A$_2$, 18B$_2$, 18A$_3$, 18B$_3$, 18A$_4$, and 18B$_4$, to alternately pass the wire W in opposing axial directions to the bottom end 10b and top end 10a of the stator assembly 11. A portion of the length of wire W that does not pass through the first wire passage 18A$_1$ and extends forward from the top end 10a of the stator assembly 11 forms the first terminal 40a (FIG. 6A) of the winding, and the last pass of the wire W through the wire passage 18B$_4$ positions a second terminal end 40b (FIG. 6B) extending forward from the top end 10a of the stator assembly 11. It may be understood that, for the presently described embodiment, the order of passing the wire through the wire passages 18 of the first and second insert members 16a, 16b can be reversed wherein the wire W can be initially passed from the top end 10a to the bottom end 10b of the stator assembly 11 through the wire passage 18B$_4$, and the wire W is sequentially passed through the wire passages 18 in a reverse order from that described above, with the last pass of wire forming the first terminal end 40a extending from the wire passage 18A$_1$.

The conductor for each winding is a single, thick strand of wire W of a predetermined length that is threaded into the insert members 16. The wire may be a substantially thick diameter (e.g., 9 gauge) compared to the wire used in prior winding processes. The four wire passes defined by the insert members 16 through the slots 14, as illustrated for the present embodiment, can provide sufficient conductive area with the required number of winding turns for each winding in the motor to meet motor operability requirements. However, as is described below additional aspects of the invention can include provision of windings having additional turns, and may be formed of a wire gauge other than the thick diameter gauge described herein.

The insert members 16 guide or direct the wire W for axial insertion in the integral cylindrical stator stack or core 10 so that it is not necessary to insert the wire W to the slots 14 through the gaps G between the stator teeth 12 at the ID of the stator 10. Hence, the larger diameter wire W can be used. Additionally, the gap G between the stator teeth 12 at the ID of the stator 10 can be minimized to reduce cogging during operation of the motor. In particular, it may be noted that the gap G between teeth can be a substantially smaller dimension than the diameter of the wire W.

Figure 4B:
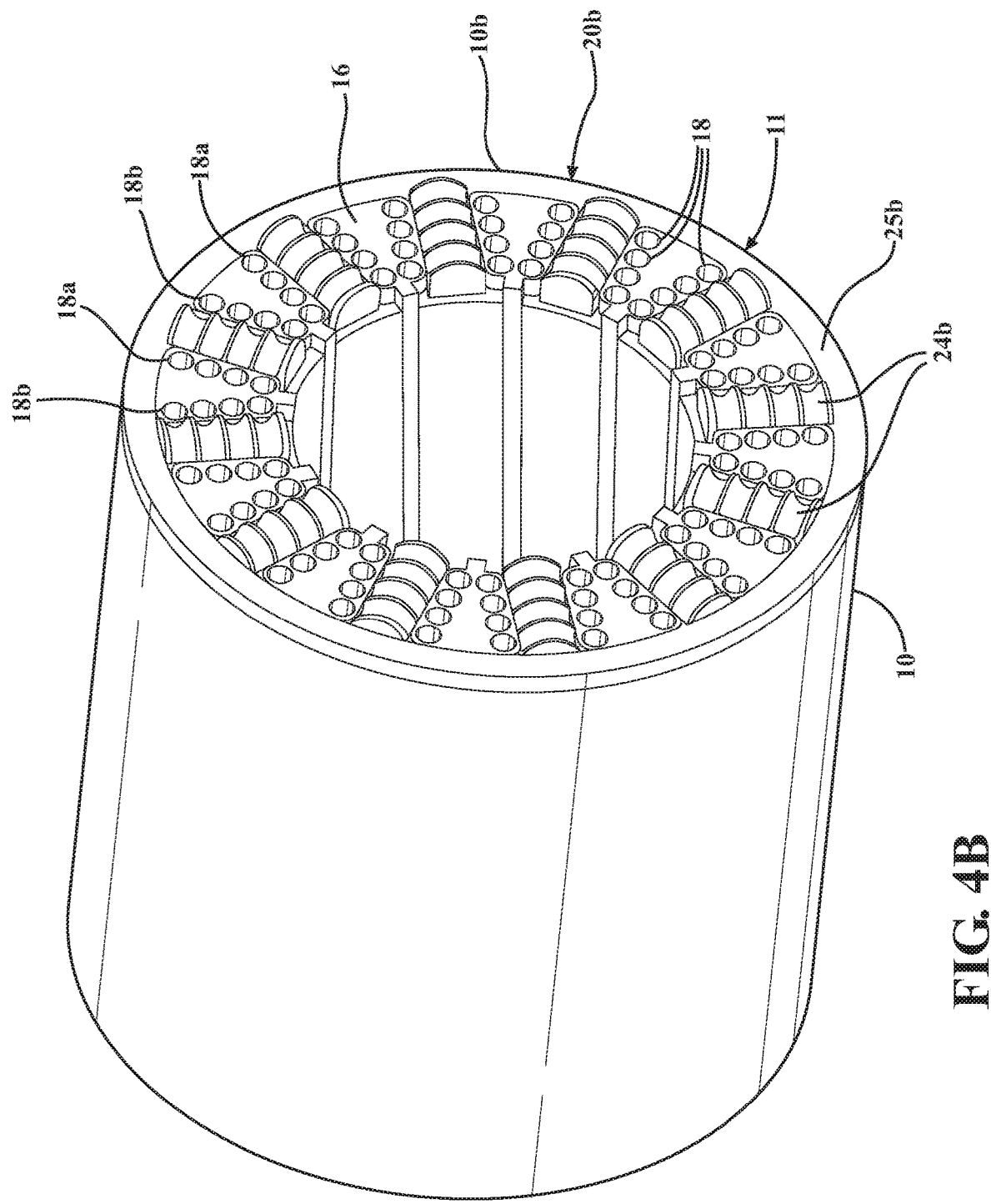
FIG. 4B is a perspective end view of the stator assembly comprising insert members inserted in the stator slots and including a bottom end lamina positioned on the end of the stator.
Figure 5A:
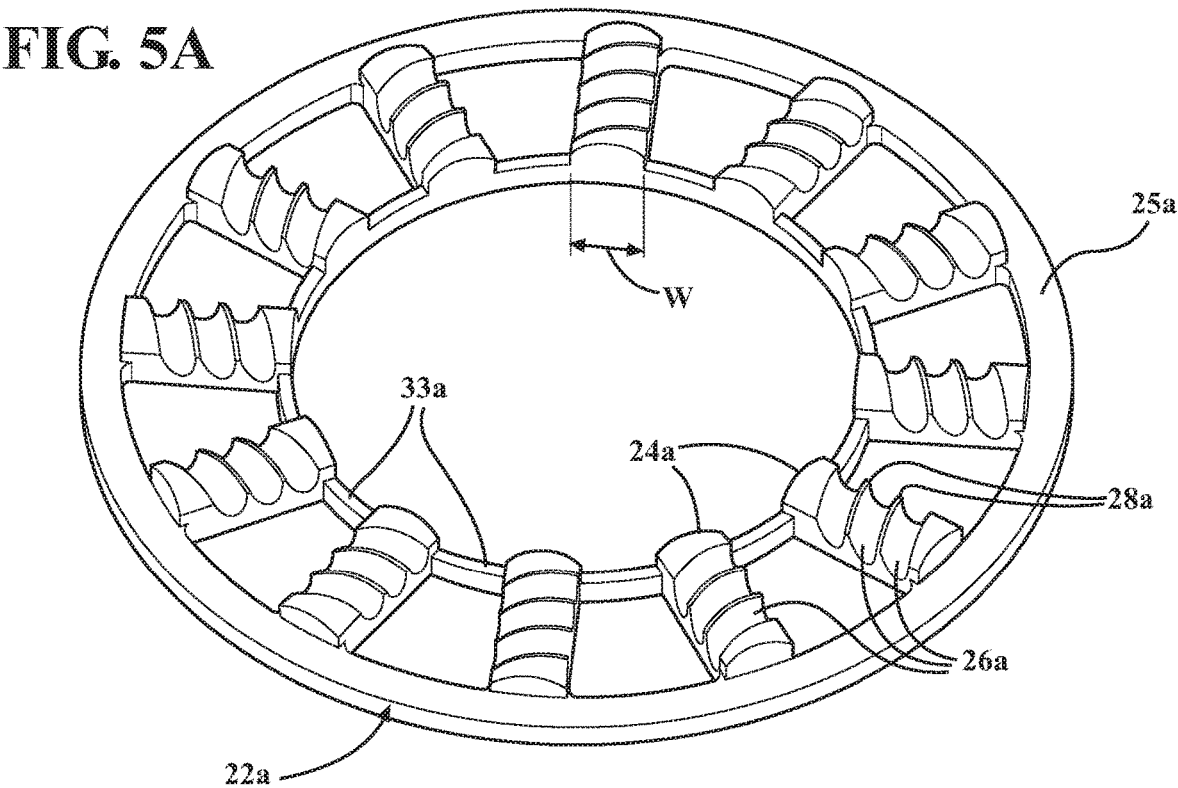
FIG. 5A is a perspective view of a top end lamina.
Figure 5B:
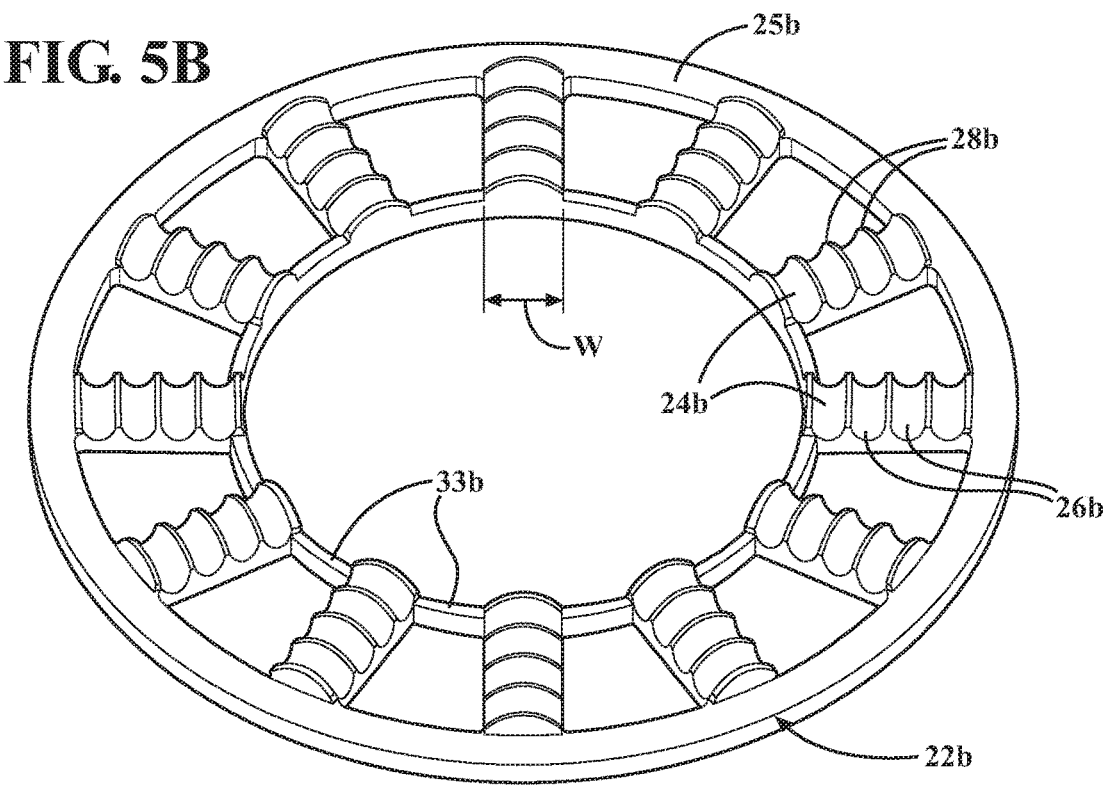
FIG. 5B is a perspective end view of a bottom end lamina.

As noted above, the insulation system can further include end laminae 20a, 20b that form end laminae of the stator core 10. Referring to FIGS. 1, 4A and 4B, the top end 10a of the stator assembly 11 is provided with a top end lamina 20a and the bottom end of the stator assembly 11 is provided with a bottom end lamina 20b. Each end lamina 20a, 20b is formed of an electrically insulating material to insulate the end turns 22a, 22b (see FIGS. 6A and 6B) from the stator core 10. The end lamina 20a includes a plurality of circumferentially spaced, radially extending tooth portions 24a joined by an outer support ring 25a. Similarly, the end lamina 20b includes a plurality of circumferentially spaced, radially extending tooth portions 24b joined by an outer support ring 25b. The support rings 25a, 25b each define a diameter that matches the diameter of the yoke 8 of the stator core 10. The tooth portions 24a, 24b each define a width W (FIGS. 5A and 5B) that is at least as wide as the width of the stator teeth 12, providing sufficient material to span between circumferentially adjacent insert members 16 and isolate the end turns 22a, 22b from the end surfaces of the stator teeth 12. As is illustrated in FIGS. 5A and 5B, an alternative configuration of the end laminae may include inner web portions 33a, 33b that extend between the radially inner ends of respective tooth portions 24a, 24b and can define a continuous inner surface having a diameter matching the ID of the stator core 10.

Each of the tooth portions 24a, 24b include inward extending grooves 26a, 26b defined between axially projecting ridges 28a, 28b. The end laminae 20a, 20b are positioned on the stator 10 such that the tooth portions 24a, 24b form a final lamina at respective ends of the stator teeth 12 for guiding the wire W to radially spaced positions, separating adjacent passes of the wires W from each other at the end turns 22a, 22b. The groove surfaces of the end laminae 20a, 20b extend out at a circumferential radius that matches the radius of the end turns 22a, 22b. The grooves 26a of the end lamina 20a at the top end 10a of the stator assembly 11 are different from the grooves 26b of the end lamina 20b at the bottom end 10b of the stator assembly 11. The grooves 26a of the end lamina 20a at the top end 10a of the stator assembly 11 are angled to accommodate end turns 22a of the wire W extending between wire passages 18 located at different radial locations in adjacent insert members 16 positioned on either side of a stator tooth 12, see FIG. 7. The grooves 26b of the end lamina 20b at the bottom end 10b of the stator assembly 11 are oriented straight across to guide the wire W between wire passages 18 at the same radial location on two adjacent insert members 16.

Figure 6A:
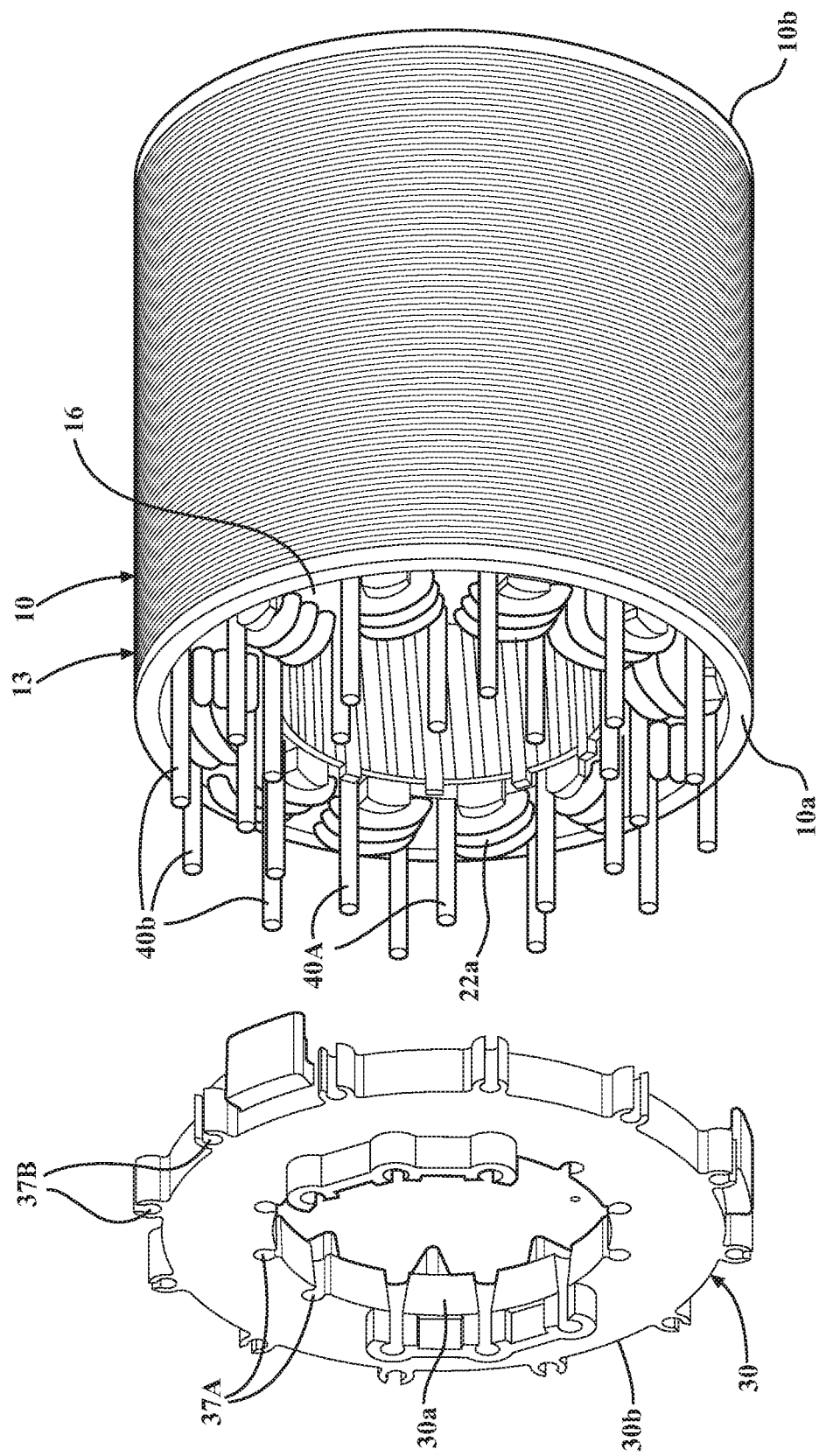
FIG. 6A is a perspective view of a top end of a wound stator and illustrating a top end component for positioning on the wound stator.
Figure 6B:
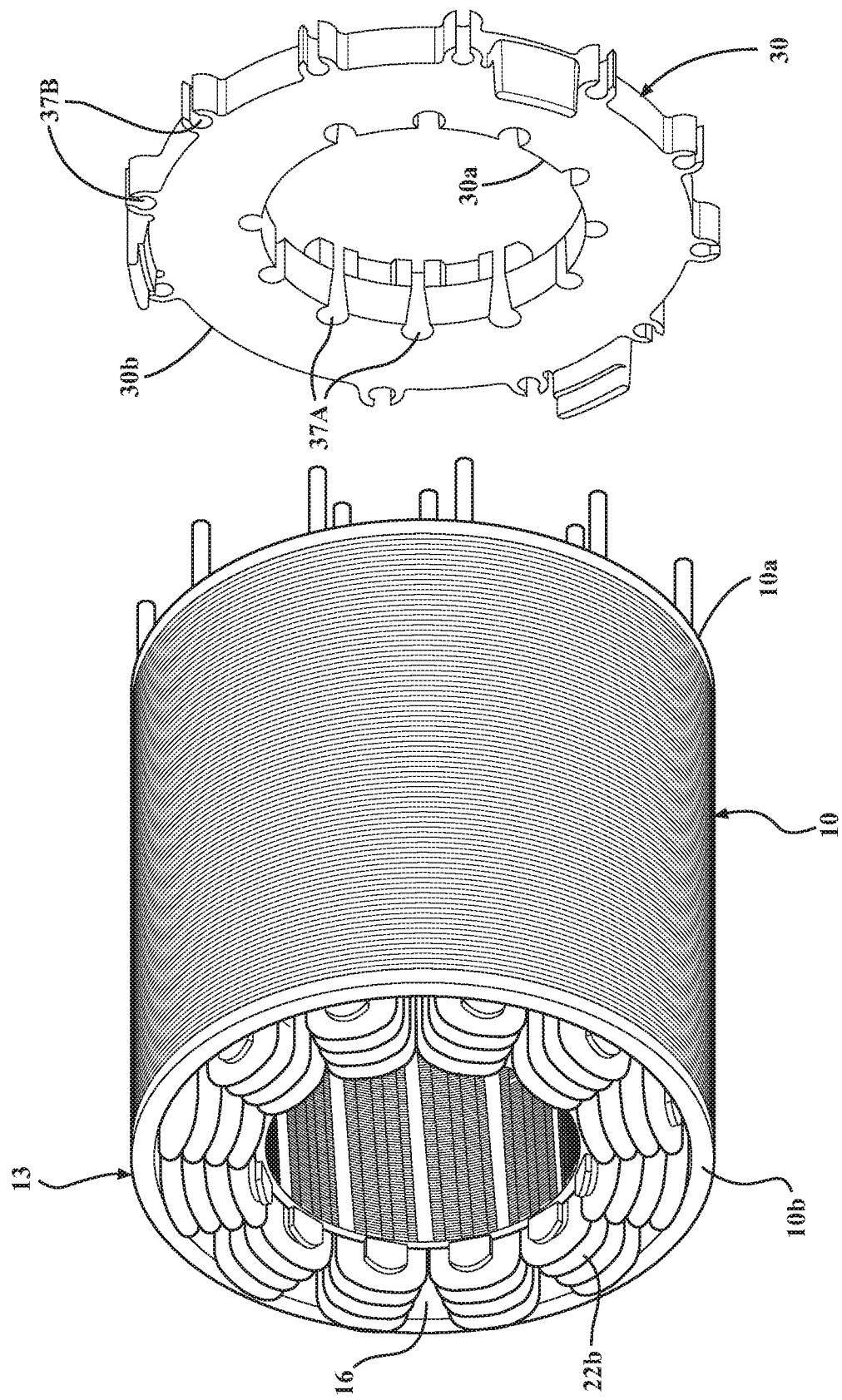
FIG. 6B is a perspective view of a bottom end of a wound stator and illustrating the top end component for positioning on the wound stator.
Figure 7:
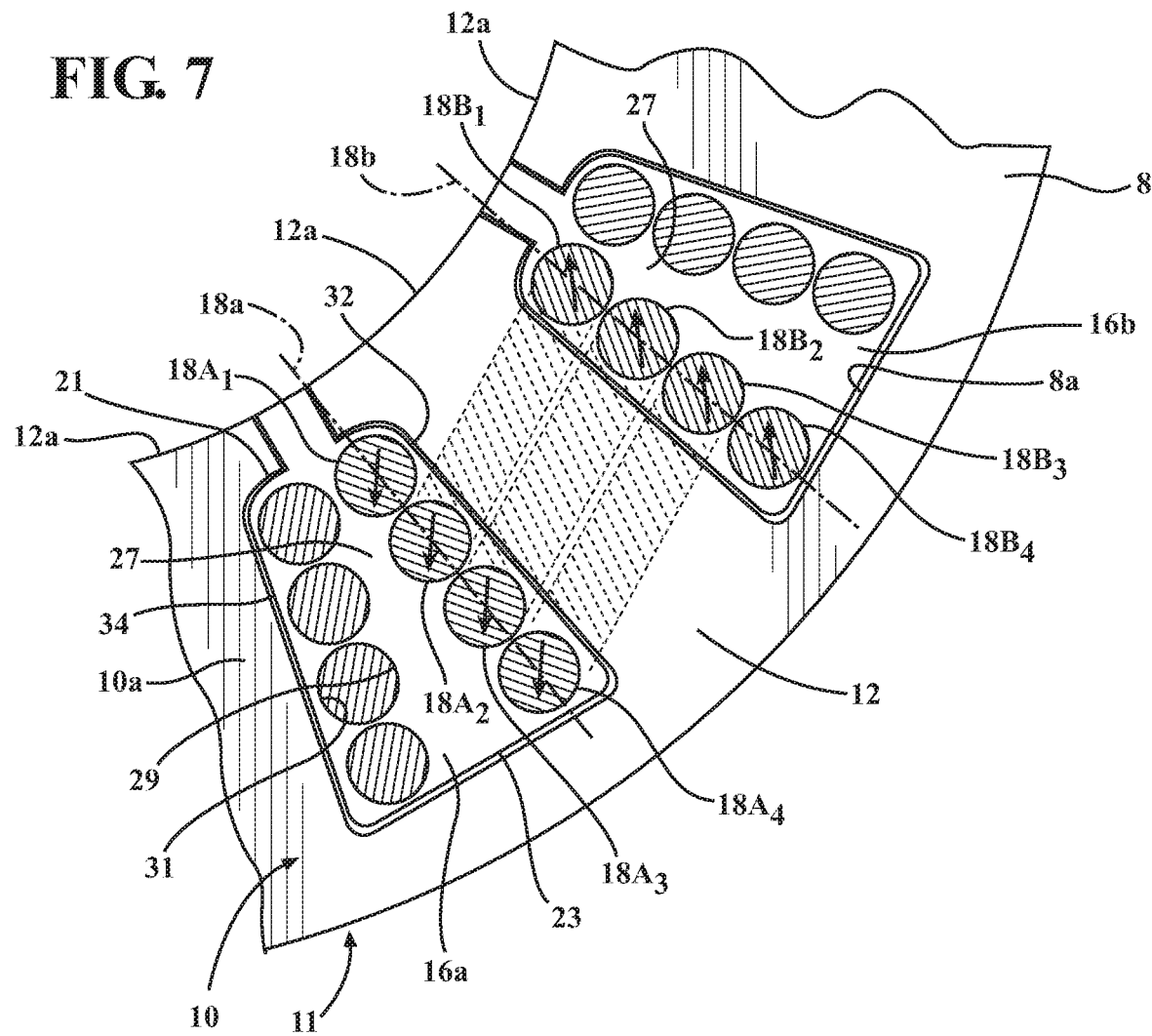
FIG. 7 is a diagrammatic end view of a portion of the stator assembly with two wire guides labeled to describe a wire winding operation.

Referring to FIG. 6A, the wound stator 13 is provided with a top end component 30 that can form a protective structure over the top end 10a of the wound stator 13. For example, the end component 30 may be a lead frame defining phase connections between the leads 40a, 40b. The top end component 30 can include channels to receive leads or terminal ends 40a, 40b extending from the wound stator 13. In particular, the channels comprise a plurality of inner channels 37A located at an inner circumferential location 30a of the end component 30, each of the inner channels 37A receiving a respective terminal end 40A therethrough, and a plurality of outer channels 37B located at an outer circumferential location 30b of the end component 30, each of the outer channels 37B receiving a respective terminal end 40B therethrough. The leads 40a, 40b can extend out from the wound stator 13 at precise repeatable locations due to the characteristics of the present winding process and the rigidity of the thick wire used for the process. The ends of the leads 40a, 40b can be chamfered or rounded (or form a bullet nose end) to facilitate guiding the ends of the leads 40a, 40b into the channels 37A, 37B in an automated process for placing the top end component 30 on the wound stator 13. Alternatively, or in addition, each of the channels 37A, 37B of the top end component 30 may be formed with an enlarged or tapered entrance at an inner side of the end component 30 facing the wound stator 13 to facilitate entry of the wire ends to the channels 37A, 37B as the top end component 30 is moved into position over the end turns 22a.

Figure 8:
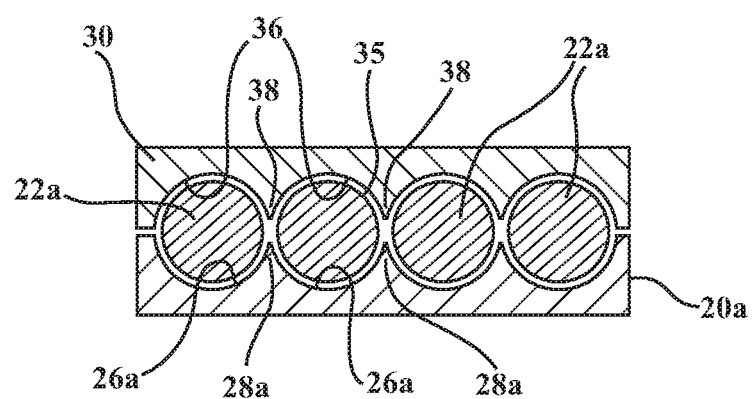
FIG. 8 is a cross-sectional view through an assembly at a top end of a wound stator, illustrating a top end component in accordance with one aspect of the invention in position over a winding end turn and the top end lamina.

FIG. 8 illustrates an alternative configuration for the top end component 30 and shows a cross section defined by a radial plane extending through the top end turns 22a and the assembly comprising the top end lamina 20a and the top end component 30. As seen in FIG. 8, the inner side of the top end component 30 may be provided with grooves 36 defined by circumferentially elogated ridges 38 that extend axially to, or preferably close to, contact with the ridges 28 defining the grooves 26 of the end lamina 20a to form isolating channels 35 that surround and isolate the adjacent end turns 22a from one another.

The present design permits exact placement of wire with improved precision in the amount of wire placed in each slot 14 that can provide improved resistance and inductance balance throughout the wound stator 13. That is, the present wound stator construction provides a repeatable winding configuration for each of the windings on the stator 10 to provide consistent electrical characteristics.

A thermally conductive gap filling material may be provided to the holes defining the wire passages 18 in the insert members 16 in order to provide a thermally conductive path for heat to travel from the wire to the insert member 16. In one embodiment, the thermally conductive material can be provided to the wire during the winding process to act as a lubricant as the wire is inserted into the wire passages 18.

Figure 9:
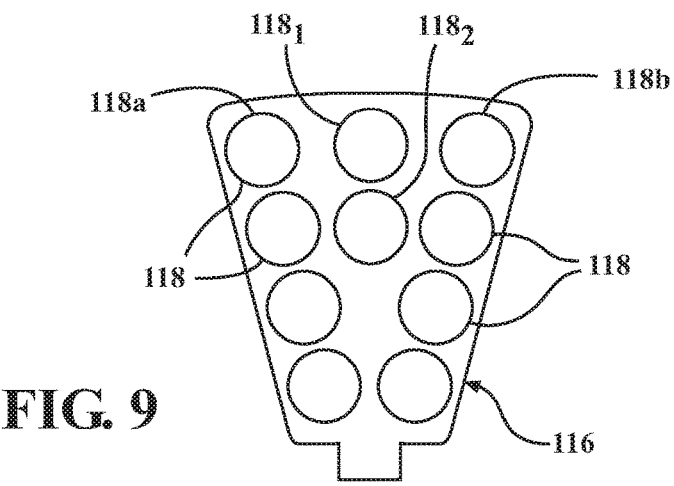
FIG. 9 is a top end view of an alternative configuration for an insert member.

Referring to FIG. 9, an alternative configuration for an insert member 116 is illustrated. The insert member 116 is provided with two rows 118a, 118b of axially extending holes defining wire passages 118 for receiving turns of a winding as described above for the insert members 16. The insert member 116 is further provided with additional axially extending holes defining wire passages $118_1$, $118_2$ circumferentially displaced between the two rows 118a, 118b. The illustrated additional wire passages $118_1$, $118_2$ permit an additional turn to be provided to each winding, and it may be understood that passages in addition to those shown could be added to increase the number of additional winding turns.

Figure 10:
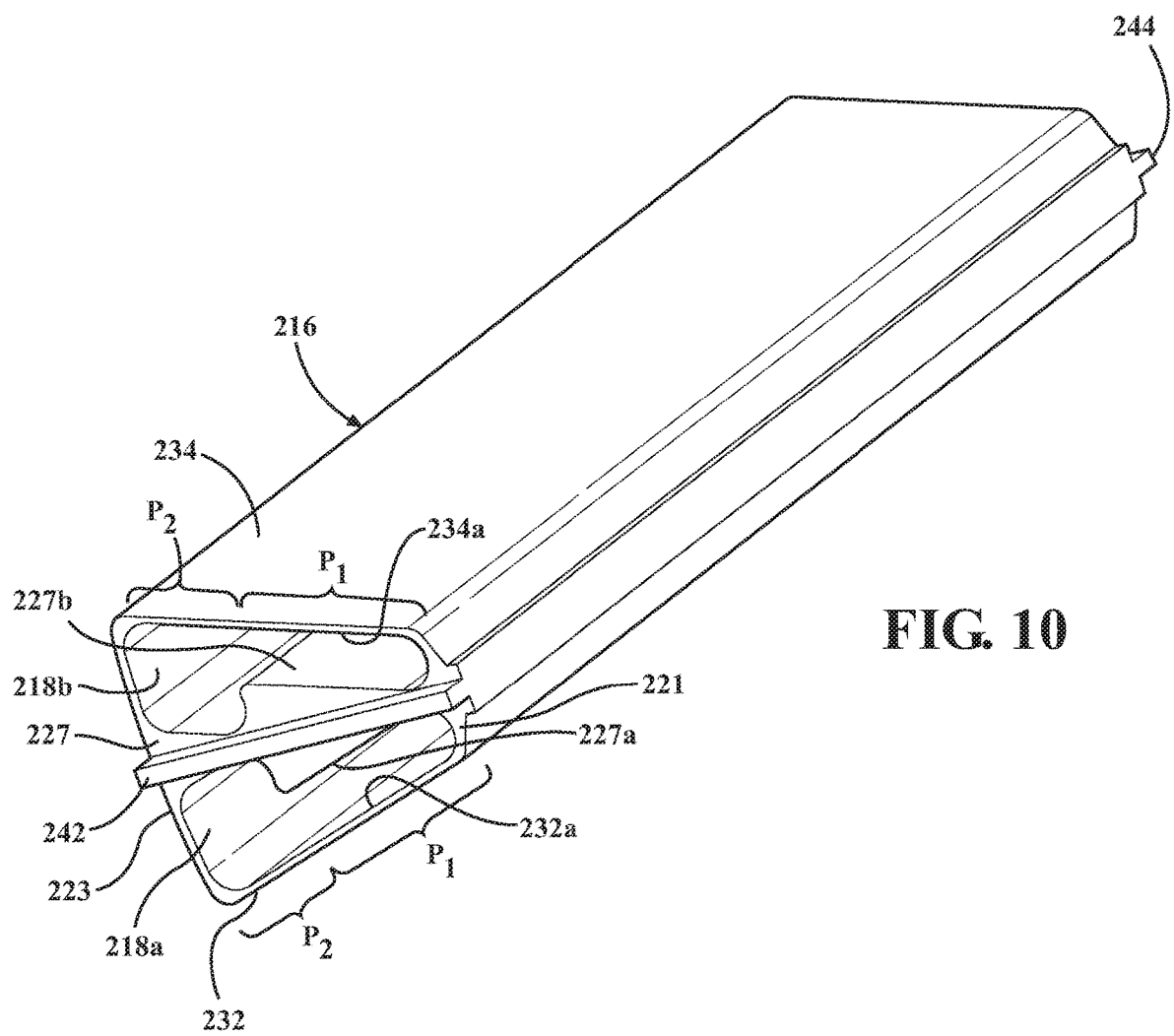
FIG. 10 is a perspective view of another alternative configuration for an insert member.

Referring to FIG. 10, another alternative configuration for an insert member 216 is illustrated. The insert member 216 is generally formed to insert in the stator slots 14 in the same manner as is described for the insert member 16, however, the insert member 216 is provided with two radially elongated insert slots 218a, 218b. Each insert slot 218a, 218b comprises a radially elongated and axially extending opening defined by circumferentially spaced, radially elongated walls. In particular, each slot 218a, 218b is formed by a respective first surface 227a, 227b defined on a septum wall 227 extending between a radially inner wall 221 and a radially outer wall 223. Each slot 218a, 218b is further formed by second surfaces 232a, 234a defined on respective slot lining walls 232, 234 that extend between the radially inner wall 221 and the radially outer wall 223. The first surfaces 227a, 227b are parallel to the respective second surfaces 232a, 234a. In addition, each axial end of the insert member 216 can be provided with a respective partition 242, 244 that extends axially outward, and extends along the radial length of the insert member 216, to provide an insulating divider between the end turns of adjacent windings.

In accordance with one aspect, the first surfaces 227a, 227b are spaced from the second surfaces 232a, 234a a distance that is about equal to the diameter of the wire W along a radially inner portion $P_1$ of the slots 218a, 218b. In accordance with a further aspect, the first surfaces 227a, 227b are spaced from the respective second surfaces 232a, 234a a distance that is about equal to twice the diameter of the wire W along a radially outer portion $P_2$ of the slots 218a, 218b to form an L-shaped slot. As used in reference to the spacing dimensions of the slots 218a, 218b, the term "about" or "about equal to" refers to a tolerance range corresponding to 0% to 25% of the diameter of the wire W.

Figure 10A:
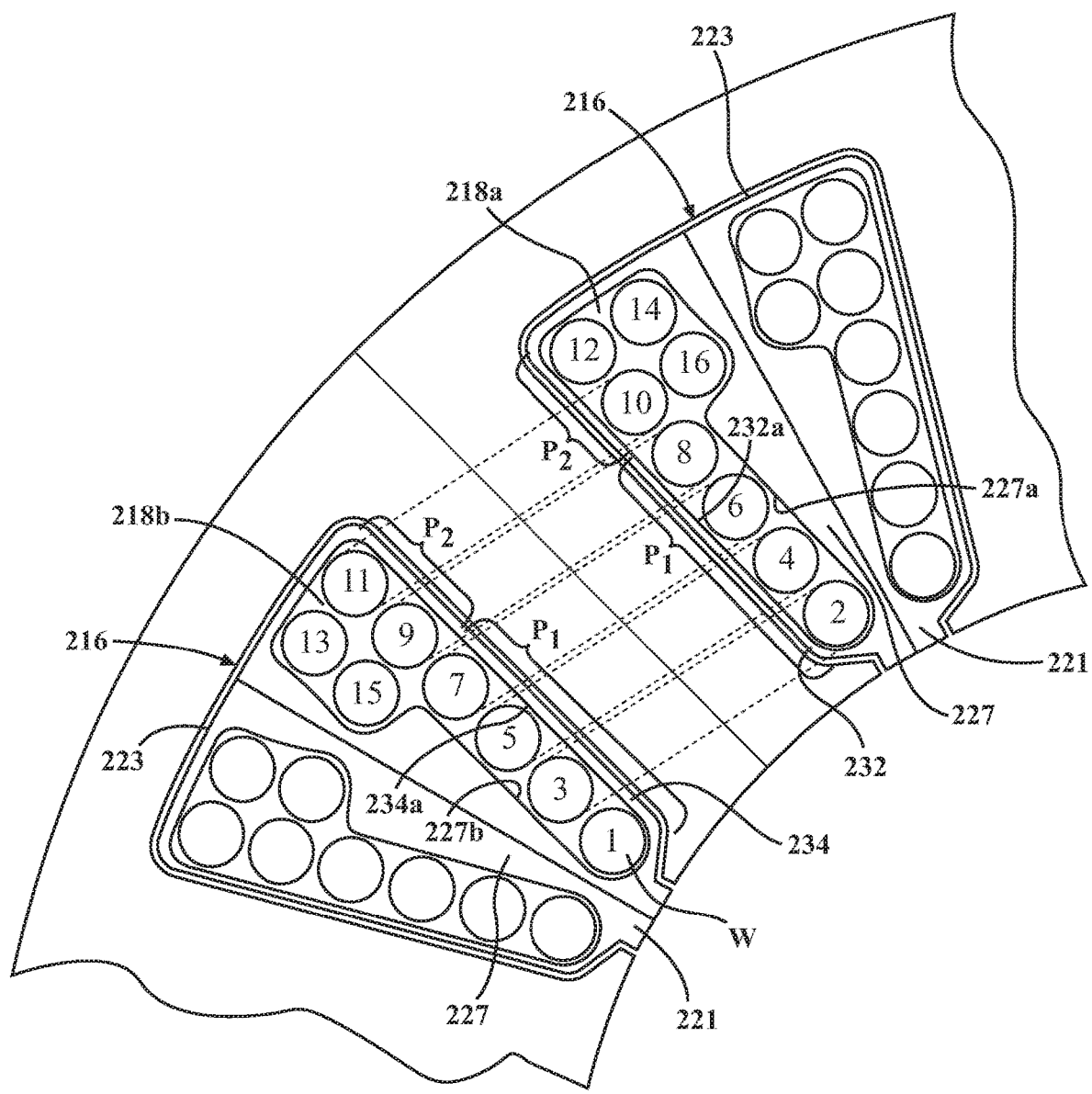
FIG. 10A is a diagrammatic end view of a portion of the stator assembly with two wire guides labeled to describe a wire winding operation using the insert member of FIG. 10.

Referring to FIG. 10A, wire W inserted in the slots 218a, 218b closely fits within the slots 218a, 218b and is guided by the pairs of slot surfaces 227a, 232a and 227b, 234a during a winding operation. The numbered locations 1-16 in FIG. 10A indicate the order of wire placement to form the winding in the slots 218a, 218b wherein the winding proceeds from the radially inner portion $P_1$ to the radially outer portion $P_2$. The final turns of the winding extending to locations 13-16 will overlap previous end turns of the winding. In one aspect, the overlapped end turns may be provided with an insulating cover (not shown), such as an insulating sheet, prior to completion of the turns extending to locations 13-16 to separate and electrically insulate the overlapping end turns from contact with each other.

Figure 11:
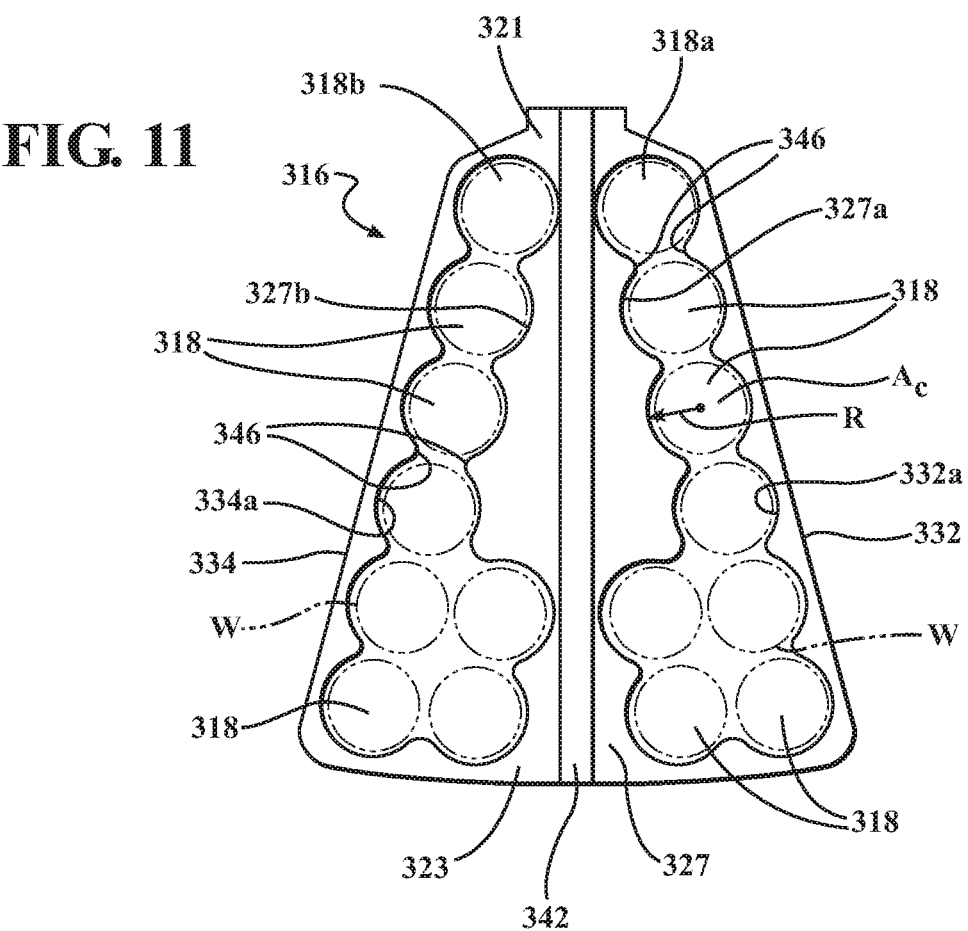
FIG. 11 is a top end view of a further alternative configuration for an insert member.

Referring to FIG. 11, an insert member 316 is illustrated comprising a modification of the previously described insert member 216. The insert member 316 is provided with two radially elongated insert slots 318a, 318b dimensioned as described above for slots 218a, 218b, including being formed as L-shaped slots. Each slot 318a, 318b is formed by a respective first surface 327a, 327b defined on a septum wall 327 extending between a radially inner wall 321 and a radially outer wall 323, and is further formed by second surfaces 332a, 334a defined on respective slot lining walls 332, 334 that extend between the radially inner wall 321 and the radially outer wall 323. In addition, each axial end of the insert member 316 can be provided with a respective partition (only top end partition 342 shown) that extends axially outward, and extends along the radial length of the insert member 316, to provide an insulating divider between the end turns of adjacent windings.

In accordance with one aspect, the slots 318a, 318b are provided with axially extending rib structures 346 that extend from the first surfaces 327a, 327b and second surfaces 332a, 334a into the respective slots 318a, 318b for defining distinct guide paths or passages 318 for engaging turns of the winding. The rib structures 346 extend between adjacent turns of the winding and define discrete curved surfaces extending axially and forming the passages 318 for engaging the turns of the winding. In particular, the curved surfaces of the rib structures 346 form radius portions, each having a radius R that intersects a central axis $A_C$ of a wire turn engaged on a respective surface 327a, 327b, 332a, 334a of the insulating structure. Generally, the surfaces 327a, 327b, 332a, 334a define circular areas for the passages 318 that receive each wire turn in concentric relation to each respective passage 318.

Figure 12:
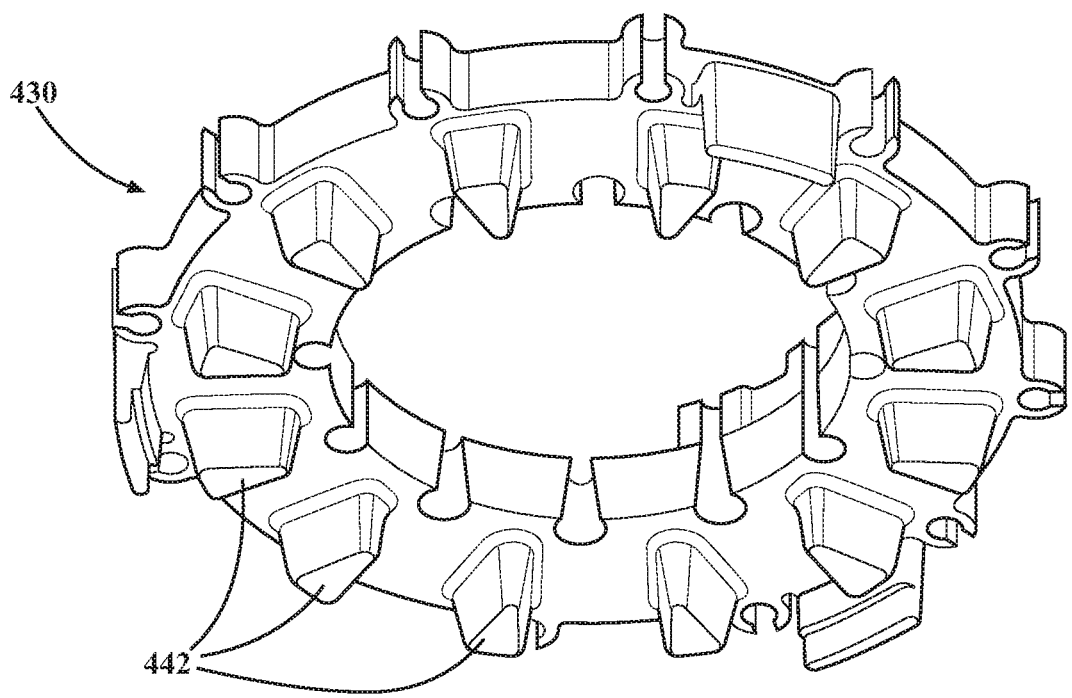
FIG. 12 is a perspective view of an alternative configuration for the top end component.

Referring to FIG. 12, an alternative construction for a partition to separate the end turns of adjacent windings 22a at the top end 10a of the wound stator 13 is illustrated. As seen in FIG. 12, a top end component 430 is provided, formed generally the same as the top end component 30, but including a plurality of partitions 442 extending axially from an inner side of the top end component 430. The partitions 442 may be formed with a wedge shaped cross-section to fit between adjacent winding end turns 22a and are configured to be positioned adjacent to respective insert members 16, forming an insulating barrier between adjacent windings, e.g., instead of the partitions 442, when the top end component 430 is located in position over the top end 10a of a wound stator 13.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A wound stator for a dynamo-electric machine comprising:
   a stator stack comprising a unitary cylindrical yoke and a plurality of circumferentially spaced, radially inward extending stator teeth defining stator slots therebetween;
   a winding formed by a continuous strand of wire of a predetermined gauge forming a plurality of turns around each stator tooth and defined by wire passes extending through the slots and connected by bent portions of the continuous strand of wire forming end turns, each winding including a first lead end extending from a stator slot on a first side of a respective stator tooth and a second lead end extending from a stator slot on a second side of the respective stator tooth; and
   an insulation system including an insulating structure extending through each stator slot between windings located on two adjacent stator teeth, the turns of each winding located between a respective stator tooth and a first surface of the insulating structure engaged with the winding.

2. The wound stator of claim 1, wherein the insulating structure further includes a second surface connected to the first surface of the insulating structure, each second surface being located between the turns of a winding and a respective stator tooth.

3. The wound stator of claim 2, wherein the first and second surfaces of the insulating structure each have radius portions, each radius portion having a radius that intersects a central axis of a wire turn engaged on a respective surface of the insulating structure.

4. The wound stator of claim 3, wherein the insulating structure comprises an insert member located in each stator slot, each insert member having axially extending holes for receiving respective turns of a winding, and each hole defining respective first and second surfaces of the insulating structure.

5. The wound stator of claim 4, wherein the holes are located in a row extending in a radial direction.

6. The wound stator of claim 5, including one or more additional holes located adjacent to and circumferentially displaced from each row of holes, the number of additional holes being less than the number of holes in each row of holes.

7. The wound stator of claim 2, wherein the insulating structure comprises an insert member located in each stator slot, each insert member having a pair of insert slots and each insert slot defined by circumferentially spaced, radially elongated walls defining the first and second surfaces of the insulating structure.

8. The wound stator of claim 7, wherein a radially inner end of the insert slots includes walls circumferentially spaced about equal to a diameter of the strand of wire.

9. The wound stator of claim 8, wherein a radially outer end of the insert slots is circumferentially spaced about equal to twice the diameter of the strand of wire.

10. The wound stator of claim 7, including axially extending rib structures on the first and second surfaces, the rib structures extending between adjacent turns of a winding.

11. The wound stator of claim 10, wherein the rib structures extending between adjacent turns of the winding define discrete curved surfaces for engaging the turns of the winding.

12. The wound stator of claim 2, wherein the insulating structure includes a radially inner wall extending in a gap between inner ends of the adjacent stator teeth and a radially outer wall extending along an inner surface of the yoke, and the first and second surfaces of the insulating structure are connected to the radially inner and outer walls.

13. The wound stator of claim 2, wherein the insulation system includes an end lamina formed of an electrically insulating material and defining an axially outer side of the stator teeth having circumferential grooves defining radially spaced positions between adjacent end turns of a respective winding, the end turns supported on outwardly facing surfaces of the grooves and the end lamina insulating the end turns from the stator stack.

14. A wound stator for a dynamo-electric machine comprising:
   a stator stack comprising a unitary cylindrical yoke and a plurality of circumferentially spaced, radially inward extending stator teeth defining stator slots therebetween;
   a winding formed by a continuous strand of wire of a predetermined gauge forming a plurality of turns around each stator tooth and defined by wire passes extending through the slots and connected by bent portions of the continuous strand of wire forming end turns, each winding including a first lead end extending from a stator slot on a first side of a respective stator tooth and a second lead end extending from a stator slot on a second side of the respective stator tooth; and
   an insulation system including an insulating septum wall extending through each stator slot between windings located on adjacent stator teeth and filling interstitial space defined between the windings on the adjacent stator teeth.

15. The wound stator of claim 14, wherein the insulation system includes a radially inner wall extending in a gap between inner ends of the adjacent stator teeth and a radially outer wall extending along an inner surface of the yoke, and the septum wall is connected to the radially inner and outer walls.

16. The wound stator of claim 15, wherein the insulation system includes stator slot lining walls connected to the radially inner and outer walls and extending radially along surfaces of the adjacent stator teeth between respective windings and stator teeth.

17. The wound stator of claim 16, including a row of axially extending holes located between the septum wall and each stator slot lining wall, and a turn of the wire strand for one winding extending through each hole in a respective row.

18. The wound stator of claim 17, including one or more additional holes located between each row of holes and a respective septum wall, the number of additional holes being less than the number of holes in each row of holes.

19. The wound stator of claim 17, wherein the insulation system includes an end lamina formed of an electrically insulating material and defining an axially outer side of the stator teeth having circumferential grooves defining radially spaced positions between adjacent end turns of a respective winding, the end turns supported on outwardly facing surfaces of the grooves and the end lamina insulating the end turns from the stator stack.

20. The wound stator of claim 19, wherein the insulation system isolates adjacent turns in each winding from contact with each other within the slots and at the end turns.

21. The wound stator of claim 15, wherein the insulation system comprises an insert member located in each stator slot, each insert member having a pair of insert slots located on either side of the septum wall, and each insert slot comprising a radially elongated and axially extending opening between the septum wall and a stator slot lining wall.

22. The wound stator of claim 21, wherein each insert slot is dimensioned in the circumferential direction to define a space about equal to a diameter of the strand of wire.

23. The wound stator of claim 22, wherein the walls defining the radially elongated openings define discrete rib structures extending between adjacent turns of a winding.

24. A wound stator for a dynamo-electric machine comprising:
- a stator stack comprising a cylindrical yoke and a plurality of circumferentially spaced, radially inward extending stator teeth defining stator slots therebetween;
- a non-conductive insert member located within each slot;
- each insert member including a plurality of axially extending holes, each hole defining a guide passage that is electrically isolated from the stator teeth;
- at least one continuous strand of wire of a predetermined gauge forming a winding having a plurality of turns defined by wire passes extending through the slots on either side of a stator tooth and connected by bent portions of the continuous strand of wire forming end turns spanning circumferentially across the stator tooth between first and second insert members located in the slots on either side of the stator tooth.

25. The wound stator of claim 24, wherein the holes in the insert members are arranged in rows, each row being oriented in a generally radial direction of a respective slot.

26. The wound stator of claim 25, wherein each insert member includes two rows of holes located on circumferentially spaced sides of each slot adjacent to a tooth.

27. The wound stator of claim 26, including additional axially extending holes located between the two rows of holes, the number of additional holes being less than the number of holes in each row of holes.

\* \* \* \* \*